June 24, 1941.    D. G. C. LUCK    2,247,029
NAVIGATION INSTRUMENT
Filed Jan. 31, 1939    3 Sheets—Sheet 3

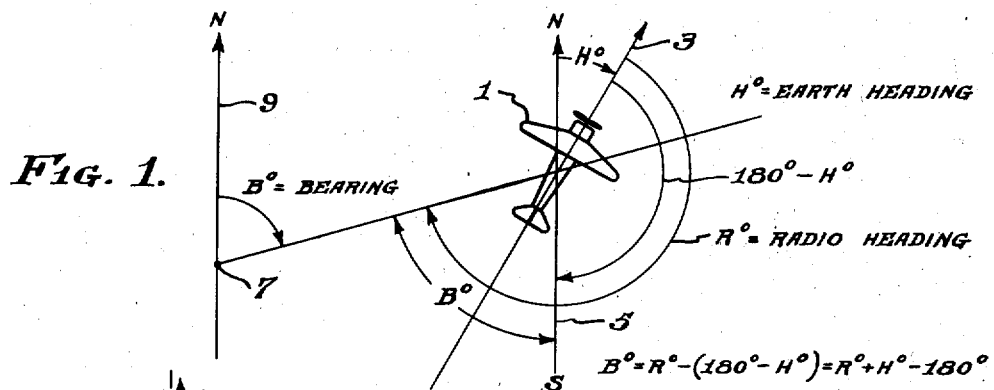
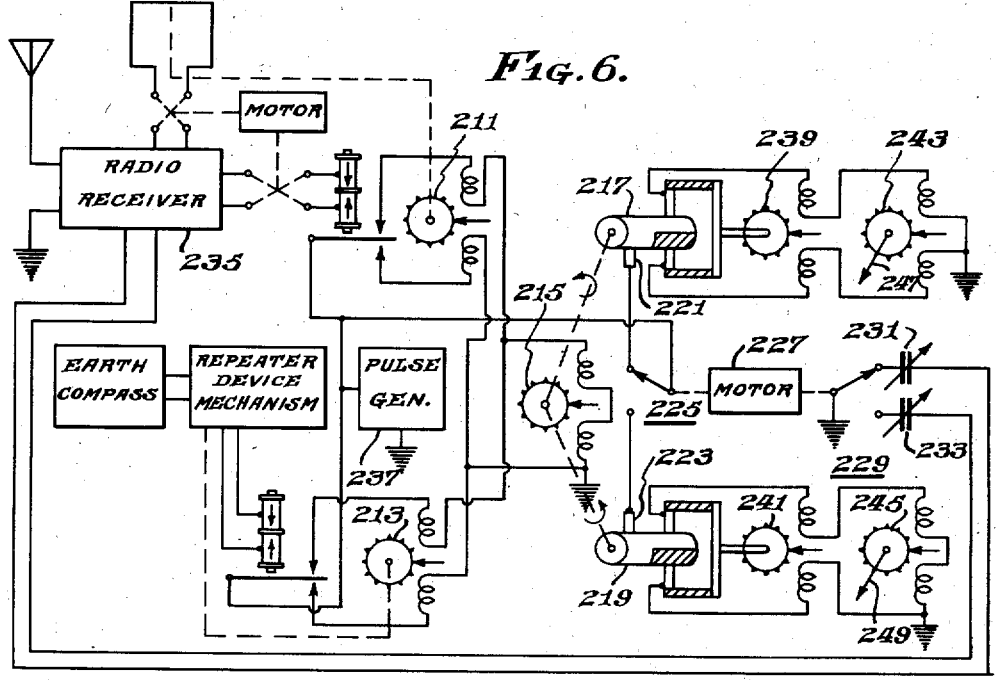
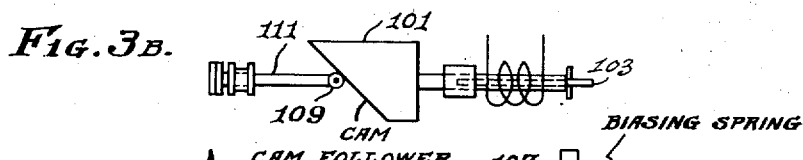
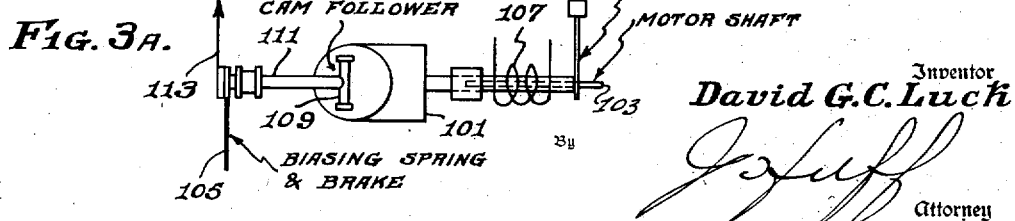

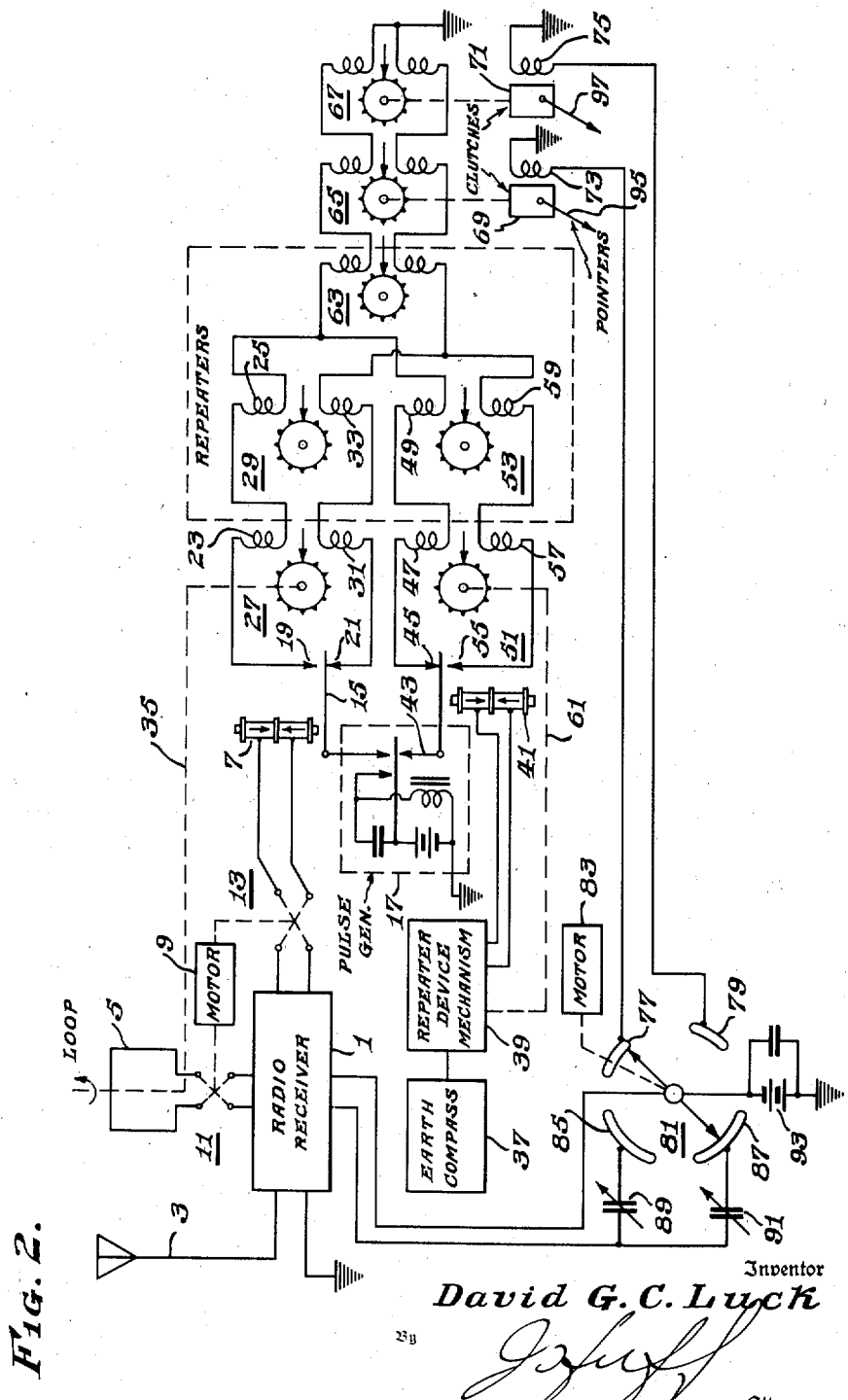

*Inventor*
David G. C. Luck

Patented June 24, 1941

2,247,029

UNITED STATES PATENT OFFICE 2,247,029

NAVIGATION INSTRUMENT

David G. C. Luck, Oaklyn, N. J., assignor to Radio Corporation of America, a corporation of Delaware Application January 31, 1939, Serial No. 253,890

10 Claims. (Cl. 250—11)

This invention relates to navigation instruments and, more particularly, to an instrument in which radio headings and earth compass headings are combined to indicate a radio bearing with respect to a meridian. The invention further contemplates the use of crossed pointers on a map to indicate position as a function of two radio bearings.

If an earth compass of the magnetic, earth inductor or gyroscopic type is used on a mobile vehicle, the compass will indicate the heading of the vehicle with respect to the meridian. If a radio compass is used, it will indicate a line, with respect to an axis of the vehicle, on which a radio transmitter is located. If the radio compass has "sense," it will indicate not only the line along which the radio station is located, but the sense of direction of the transmitter. If the radio bearing of the vehicle with reference to a meridian line be required, it is necessary to add algebraically the radio compass indication and the earth compass indication.

If position is to be determined, it is customary to use two or more bearings. The intersection of two bearings will indicate position. It has been proposed to employ a pair of crossed indicators on a map. The axes about which the indicators rotate are made to correspond respectively to the locations of a pair of radio transmitters. The bearings obtained by radio are indicated by the pointers and their intersection indicates position. When such a device is stationary, the means for operating the pointers may be relatively simple. If the map installation is used on a vehicle which may be continuously changing its heading, it becomes necessary to make corresponding changes in the orientation of the map or both pointers. The means previously employed to either orient the map or the pointers have been complex.

It is an object of the present invention to provide relatively simple means for effecting true bearing or position indications on a mobile vehicle.

Another object is to provide means for obtaining radio bearings related to a meridian.

Another object is to provide means for combining the indications of a radio compass and an earth compass to obtain radio bearings related to a meridian.

A further object is to provide means for obtaining a pair of bearings by combining radio and earth compass indications.

A still further object is to provide means for indicating position on a map by applying automatically indications of bearings obtained by radio.

The invention will be described by referring to the accompanying drawings in which—

Figure 1 is a diagrammatic presentation of the navigational problem to be solved.

Figure 2 is a schematic representation of one embodiment of the invention,

Figures 3A and 3B are side and elevational views of an element of the invention, Figure 4 is a plan view representing a position indicator, Figure 5 represents another embodiment of the invention, and Figure 6 represents a modification of the arrangement represented by Fig. 5.

Referring to Fig. 1, the operator of an airplane 1 flying a course 3 obtains its earth heading $H°$, in terms of angular departure from the north-south meridian line 5, by means of an earth compass. By means of radio compass, a radio heading $R°$ is obtained from a radio transmitter located at the point 7 on a meridian line 9. The actual bearing of the aircraft from the radio transmitter, with respect to the meridian line, is $B°$ which may be determined from the equation $$B° = R° - (180° - H°) = R° + H° - 180°$$

The foregoing problem in navigation may be solved by combining, automatically, bearing indication from the radio and earth compasses, as will be explained by reference to Fig. 2. A radio compass receiver 1 is connected to an antenna 3 and a loop 5. The connections from the loop are reversed in synchronism with the connections to a differential relay 7 by means of motor 9 driven switches 11, 13. The movable terminal 15 of the differential relay is connected to one phase of a pulse generator 17. One fixed terminal 19 of the differential relay is connected to the forward windings 23, 25 of a pair of motors 27, 29. The other terminal 21 is connected to the reverse windings 31, 33 of the motors. These motors are preferably of the impulse driven type including a ratchet, or its equivalent, to positively position the armatures. The first motor 27 is connected by a shaft 35 to the loop 5 for orienting the loop. The second motor 29 is a heading repeater motor whose function will be described hereinafter.

An earth compass 37, of the gyro or other suitable type, is connected to a repeater device mechanism 39 which, for example, may be of the type disclosed in Figs. 3 and 4 of U. S. Patent 2,080,511, granted May 18, 1937. The output of the repeater device is connected to a second differential relay 41. The fixed terminal 43 of the second differential relay 41 is connected to a second phase of the pulse generator circuit. One of the fixed terminals 45 of the differential relay is connected to the forward windings 47, 49 of a pair of impulse motors 51, 53. The other fixed terminal 55 of the second differential relay is connected to the reverse windings 57, 59 of the motors 51, 53. The first of these motors 51 is a servo motor, coupled by a shaft 61 to the follow-up or repeater mechanism 39. The follow-up device 39 may be any one of the types well known in the art. It must, however, exert no reaction on the compass proper.

The field windings of the four motors 27, 29, 51, 53 are connected in series parallel to the field windings of a third repeater motor 63. The field windings, forward and reverse, of the third repeater motor are connected in series with corresponding field windings of two bearing indicating motors 65, 67. The terminals of the final pair of field windings are connected to ground to provide a return path to the pulse generator circuit.

The motors 65, 67 are connected, respectively, to clutches 69, 71. The clutches will be hereinafter described. They are energized by solenoid windings 73, 75 which are connected to ground and to terminals 77, 79 of a synchronously operated switch 81. The switch may be operated by a motor 83. The other fixed terminals 85, 87 of the switch 81 are connected to tuning elements 89, 91 which are connected to the radio receiver 1. The movable contact of the switch is connected to ground through a battery 93 which energizes the clutch windings 73, 75. The battery is by-passed for radio frequency currents.

The bearing motors 65, 67 are engaged to and disengaged from their respective pointers 95, 97 by clutches 69, 71. It is desirable to fix the pointers in a definite position during the periods when the clutches are disengaging and it is necessary that the clutches be of the positive position type. One suitable form of clutch is shown in Figs. 3A and 3B. The movable portion of the clutch 101 is slidably connected to the motor shaft 103 by means of splines or other suitable means to prevent relative rotation. The movable portion of the clutch includes a biasing spring 105 which may be arranged to disengage the clutch. The solenoid winding 107 is arranged to attract the armature whereby the cam surface of the clutch is caused to engage a cam follower 109. The cam follower is mounted on a shaft 111 which carries an indicator or pointer 113 which corresponds to one of the pointers 95, 97. The shaft 111 is arranged to rotate freely during the clutch engagement. When the clutch is disengaged, a biasing spring 115 applies a brake to lock the pointer 113 in position.

The operation of the foregoing instrument is essentially as follows: The radio receiver 1, being tuned to a transmitter operating on one frequency, causes the differential relay 7 to engage either the upper 19 or the lower contact 21 if the loop is not properly oriented with respect to the direction and "sense" of the transmitting station. Such engagement will drive the impulse motor 27 clockwise or counter-clockwise, as the case may be, thereby orienting the loop 5 to the radio heading of the transmitter. The pulses which operate the loop orienting motor 27 are also applied to the repeater motors 29, 63 and to the pointer motors 65, 67 so that the armatures of each of these motors operate in synchronism with respect to each pulse applied during the contacting of the differential relay 7. If no other impulses were applied, the five motors 27, 29, 63, 65, 67 would be operated in synchronism and their armatures would adopt positions corresponding to the loop position, which indicates the radio heading.

The orientation or heading of the earth compass, with respect to the follow-up or repeater mechanism, is caused by this mechanism to actuate the differential relay 41. If the current in the differential relay is not zero, one 45 or the other 55 of the differential relay contacts will be connected so that pulses from the pulse generator are applied to the motor 51. The armature of the motor will be driven clockwise or counter-clockwise, as the case may be, so that the shaft 61 drives the repeater mechanism 39 until the mechanism repeats the earth compass heading. The same pulses which are applied to the motor 51 are applied to the repeater motor 53 and to the bearing indicator motors 63, 65, 67.

Thus it follows that pulses derived as a function of the radio compass heading and the earth compass heading are applied to the bearing indicating motors 63, 65, 67. These pulses will cause the motors 63, 65, 67 to adopt armature positions which represent the algebraic sum of the radio heading and the earth heading, as described by reference to Fig. 1.

Since one of the clutches (69 or 71) will be engaged immediately after the loop is oriented, its pointer (95 or 97, as the case may be) will then follow the bearings indicated by its motor (either 65 or 67). When the loop is tuned to the other transmitter, the first-mentioned clutch will be disengaged and then the three motors will be oriented to correspond to radio bearing of the second station and the pointer of the second clutch will be oriented to the second radio bearing. In the meantime, the first-mentioned pointer remains locked in position corresponding to the first bearing. It should be understood that the alternate tuning to the two transmitting stations is accomplished at a rate which permits the loop to become oriented to indicate the bearing of first one and then the other of the stations.

If a single bearing indication is required, it should be understood that a single tuning may be used and the pair of clutches may be omitted. The repeater motors 29, 53 and 63 are not essential to the invention, but are considered desirable to provide for unitary and remote indications of the earth heading (H°), radio heading (R°) and bearing (B°).

If a pair of pointers are used, it is possible to automatically and directly indicate position by utilizing the arrangement, for example, of Fig. 4. A map 117 is fastened to a suitable support. The axes 119, 121 of the pointers 123, 125 are set to correspond to the respective transmitter locations. The pointers 123, 125, corresponding to the pointers 95, 97, are oriented by the bearing motors and clutches as previously described, whereby each pointer or indicator assumes a position corresponding to the bearing of the respective stations. The intersection of the bearing lines is the position of the instrument. Since the bearings (B°) are obtained without reference to the course of the craft, it follows that a change in the course will not affect the position indication on the map of Fig. 4.

In Figs. 5 and 6 the foregoing arrangement has been modified to eliminate the clutches. In the modified arrangement of Fig. 5, a pair of commutator devices 151, 153 are mechanically coupled by rotating shaft or the like to the motor 155, which orients the loop 157. Since the commutator devices are identical and differ only in that one responds to one radio channel, while the other responds to a different radio channel, a single description will suffice.

The pulse generator 159 is connected through an element of the switch 161 to a slip ring connection 163 on the commutator 151. Approximately 180° of the commutator is insulated 165. An insulated yoke 167 carries brushes 169, 171 which engage the commutator in the portion which includes insulation and conductive material. The yoke 167 is connected to the armature of a follower motor 173. The brushes 169, 171 are connected to the field coils, forward and reverse, 175, 177 of the follower motor, to the corresponding field coils of a repeater motor 179, to the field coils of a radio bearing indicator motor 181, and to the field coils of a radio bearing repeater motor 183.

An earth compass 185, repeater drive mechanism 187, differential relay 189, and follower motor 191 are connected as previously described. The follower motor is also connected to a compass heading repeater motor 193. The field terminals of the compass heading repeater motor are connected to the movable contacts of a switch 195. Two of the fixed contacts of this switch 195 are connected to the repeater motor 183 and bearing motors 181, whereby these motors will respond to the algebraic sum of the pulses applied thereto. It should be understood that the second channel includes the commutator device 153, radio heading repeater motor 197, radio bearing repeater motors 199 and 201. The compass circuit is applied to the second channel by means of the switch 195, while impulse power is simultaneously supplied thereto by means of the switch 161.

The radio compass receiver includes a switch 203 which is connected to a pair of tuning elements 205, 207. The switches 161, 195 and 203 are operated in synchronism whereby first one channel and then the other channel for indicating and repeating radio bearings is energized. The synchronously operated switches may be driven by a motor 209 at a speed which is sufficiently slow to enable the loop to orient itself with respect to each of the desired transmitting stations.

The operation of the foregoing instrument is essentially as follows: Assuming that one radio channel is energized, the loop will be oriented to indicate the radio heading as a function of the transmitter in question. This orientation of the loop will orient the commutator 151. The follower motor 173 will then be energized from a connection through the commutator to the pulse generator whereby the follower motor is progressively driven clockwise or counter-clockwise, as the case may be, until the brushes 169, 171 reach the insulated portion 165 of the commutator, at which time no further pulses will be applied to the follower motor. Since the repeater motors 179 and 183 and the bearing indicator motor 181 are all connected to the follower motor, their respective armatures will operate in synchronism with the follower motor and will take the same positions so far as the application of pulses derived as a function of the radio heading is concerned.

The earth compass heading operates the follower motor 191 and the earth compass heading motor 193 as previously described and, at the same time, the pulses which are derived as a function of the earth compass heading are applied to the radio bearing motor 181 and the radio bearing repeater motor 183. In this manner, a pointer 209 attached to the radio bearing motor 181 will indicate the radio bearing in terms of a meridian, as previously explained.

In a like fashion, the second channel indicates the radio bearing and radio heading by means of the motors 199 and 201, and 197, respectively. It should be understood that the five motors 179, 183, 193, 197 and 199 are repeater motors which are used only for remote indications. The remote indicators include two radio headings, two radio bearings and an earth heading.

In Fig. 6, a somewhat different arrangement is used. In this instrument, the radio compass orienting motor 211 and the earth compass following motor 13 are connected respectively to a third motor 215. The armature of the third motor responds to the algebraic sum of the impulses applied to the radio compass orienting motor and to the earth compass motor. In other words, the armature of the third motor 215 assumes a position corresponding to the radio bearing referred to a meridian. The armature of the third motor is connected mechanically to a pair of commutator devices 217, 219 which are similar to the commutator devices previously described in connection with Fig. 5.

The slip ring connections 221, 223 of the commutators are connected respectively to the fixed terminals of a two-position switch 225. The two-position switch is operated by a motor 227 which also controls synchronously a second two-position switch 229. The fixed terminals of the second switch are connected to tuning elements 231, 233 which regulate the tuning of the radio receiver 235. The switch 225 applies energy from the pulse generator 237 to first one and then the other of the commutator devices 217, 219. The rate of the application of this energy is sufficiently slow to permit the loop to orient alternately with respect to a pair of transmitters radiating waves of different frequencies.

The energy from the pulse generator is applied to follower motors 239, 241 which drive the brushes of the commutator devices to a position which disconnects the commutators from the pulse generator. The same pulses which energize the follower motors also energize the radio bearing repeater motors 243, 245 which are connected in series with the field windings of the follower motors. The armatures of the repeater motors 243, 245 preferably include pointers 247, 249 which indicate, respectively, the two orientations of the loop.

If the pointers of the radio bearing repeater motors are arranged on a map so that their axes correspond to the transmitting stations, the intersection of the pointers will indicate position irrespective of the orientation of the map. It should be understood that additional repeater motors may be used to provide remote indications of the radio heading, earth heading and radio bearings.

Thus, the invention has been described as a navigation instrument in which indications of earth and radio headings are obtained and combined to indicate a radio bearing with respect to a meridian. It should be understood that the invention is not to be limited to any particular form of self-orienting radio compass. Since the details of the radio receiver are not part of this invention, no detailed description has been given.

A description of a self-orienting radio compass is disclosed in the copending application of Bond and Carlson, Serial No. 196,817, filed March 19, 1938, entitled "Self-orienting radio direction finder."

I claim as my invention:

1. A navigation instrument including, in combination, a radio compass, a servo motor device connected to the output of said compass for effecting self-orientation, an earth compass, a servo motor device connected to said earth compass for following its indications, means for applying driving pulses to each of said servo motor devices, and a motor responsive to said applied driving pulses for combining said pulses to indicate a bearing as a function of the heading indications of said radio and earth compasses.

2. A navigation instrument including, in combination, a self-orienting radio compass, a pulse driven servo motor for effecting said orientation coupled to said radio compass, an earth compass, a second pulse driven servo motor for following the heading indication of said earth compass, a source of pulse energy for said motors, and a third pulse driven motor responsive to the sum of the pulses applied to said motors for indicating a bearing as a function of said radio compass orientation and said earth compass heading.

3. A navigation instrument of the character of claim 1 including means for alternately tuning said radio compass to a pair of transmitting stations, and means operated in synchronism with said alternate tuning means for alternately indicating the bearings of said instrument from said transmitting stations.

4. A navigation instrument of the character of claim 2 including means for alternately tuning said radio compass to a pair of transmitting stations operating on different frequencies, and means operated in synchronism with said alternate tuning means for alternately indicating the respective bearings of said instrument from said transmitting stations.

5. A navigation instrument including, in combination, a self-orienting radio compass, a pulse driven servo motor for effecting said orientation coupled to said radio compass, an earth compass, a second pulse driven servo motor for following the heading indications of said earth compass, a source of pulse energy for said motors, a third pulse driven motor responsive to the sum of the pulses applied to said motors for indicating a bearing as a function of said radio compass orientation and said earth compass heading, means for alternately tuning said radio compass to a pair of transmitting stations operating on different frequencies, means operated in synchronism with said alternate tuning means for alternately indicating the respective bearings of said stations, a map, and means for applying said last-mentioned bearing indication to said map to indicate position.

6. A navigation instrument including a self-orienting radio compass, electric motor means for following said radio compass orientation, an earth compass, electric motor means for following the heading indications of said earth compass, a power source for said motors, and an electric motor responsive to forces driving each of said following means for combining said forces to indicate a bearing as a function of the earth compass heading and the radio compass orientation.

7. In a navigation instrument of the character of claim 6, means for tuning said radio compass to a pair of different frequencies whereby said radio compass may be oriented alternately to a pair of positions, a second electric motor means for following the second of said orientations, means for alternately energizing said orientation following means, and a second means responsive to forces driving said second following means and to forces driving said earth compass following means for indicating a second bearing as a function of the earth compass heading and the second of said radio compass orientations.

8. A navigation instrument including a self-orienting radio compass, an electric motor for following said radio compass orientation, an earth compass, a second electric motor for following the heading indications of said earth compass, means responsive to forces driving each of said electric motors for indicating a bearing as a function of the earth compass heading and the radio compass orientation, means for tuning said radio compass to a pair of different frequencies whereby said compass may be oriented alternately to a first and a second position, a third electric motor for following the second of said positions, means for alternately energizing said orientation following means, a second means responsive to forces driving said third electric motor and to forces driving said earth compass following motor for indicating a second bearing as a function of the earth compass heading and the second of said radio compass orientations, a map, and means for applying said first-named and said second bearing indications to said map to indicate position.

9. A navigation instrument including, in combination, a self-orienting radio compass, an impulse motor responsive to the orientation of said radio compass for indicating said orientation, an earth compass, an impulse motor responsive to the heading of said earth compass for indicating said heading, a source of power for said motors, impulse motor means responsive to the forces actuating said first and second-mentioned impulse motors for combining said forces to indicate a bearing as a function of said orientation and said compass heading, and a fourth impulse motor responsive to the combined forces applied to said third mentioned motor for repeating said last-mentioned bearing indication.

10. A navigation instrument including, in combination, a self-orienting radio compass, means electrically driven and responsive to the orientation of said radio compass to indicate said orientation, an earth compass, means electrically driven and responsive to the heading of said earth compass to indicate said heading, a source of electric power for said electrically driven means, means responsive to the electrical power driving the first and second-mentioned responsive means to indicate a bearing as a function of said orientation and said compass heading, means for tuning said radio compass to two frequencies so that said compass may be alternately oriented to two positions, a second means electrically driven and responsive to the second of said oriented positions and to said earth compass orientation for indicating a second bearing, means operated in synchronism with said alternate tuning for alternately indicating bearings, a map, and means for applying said alternately indicated bearings to said map to indicate position.

DAVID G. C. LUCK.